United States Patent [19]
van der Blom

[11] 4,321,757
[45] Mar. 30, 1982

[54] DRYING APPARATUS AND METHOD

[75] Inventor: Laurens van der Blom, Venlo, Netherlands

[73] Assignee: Océ-van der Grinten N.V., Venlo, Netherlands

[21] Appl. No.: 825,688

[22] Filed: Aug. 18, 1977

[30] Foreign Application Priority Data

Aug. 20, 1976 [NL] Netherlands ............... 7609250

[51] Int. Cl.³ ............................................. F26B 3/00
[52] U.S. Cl. ............................................ 34/23; 34/32; 34/77; 34/155; 34/242
[58] Field of Search .................. 34/32, 77, 242, 23, 34/155, 33, 148, 156

[56] References Cited

U.S. PATENT DOCUMENTS

| 420,215 | 1/1890 | Stetson | 34/77 |
| 815,373 | 3/1906 | Perkins | 34/77 |

FOREIGN PATENT DOCUMENTS

| 719528 | 10/1973 | Belgium | 34/32 |
| 1460193 | 8/1970 | Fed. Rep. of Germany | 34/32 |

Primary Examiner—J. L. Barr
Attorney, Agent, or Firm—Albert C. Johnston; Alphonse R. Noë

[57] ABSTRACT

A drying apparatus for drying material treated with liquid by heating and circulating a drying gas and for recovering vaporized liquid absorbed by a drying gas comprises at least one chamber unit which is essentially completely closed to the external atmosphere, a heating system in the chamber, a condensing system located in the chamber lowermost portion, means for guiding the material, in the form of a web, through the chamber through slot-like inlet and outlet openings such that the web is maintained free of contact at its wet surface, and a drying gas circulation system which divides the drying gas into several streams. The gas circulation system divides or splits the drying gas into a main-stream and a smaller side-stream, and repeatedly transports the main-stream past the web of material and transports the side-stream to and through the condensing system, and from the condensing system back to rejoin the main-stream, by circulation of the gas through elongated slot-like openings, formed by positioning and dimensioning of the web of material with regard to the side walls and the bottom of the chamber. A sealing system comprises at least one pair of rotatable rollers, positioned in proximity to each other, in or at a short distance from the opening made in an outer wall of a drying apparatus chamber, and positioned in such a way with regard to each other and to the web of material to pass through the drying apparatus, that the web runs between the rollers and partially over the circumference of each. Elastic sealing lips contact and press against the surfaces of the rollers to seal the space between the pair of rollers and the opening in the wall. A method of drying in the apparatus utilizes reduced oxygen content and maintenance of the dew point in the drying chamber at high levels.

13 Claims, 9 Drawing Figures

DRYING APPARATUS AND METHOD

This invention relates to a drying apparatus and method for drying liquid-treated material and recovering the liquid, and more particularly, to a drying apparatus that includes at least one drying chamber which is closed almost entirely to the external atmosphere and which is provided with a heating system and a vapor condensing system positioned below the heating system. This invention further relates to a sealing system by which material may pass through openings in a chamber, such as a drying chamber, while maintaining the chamber closed to the atmosphere.

The recovery of liquids which are vaporized when drying material treated with those liquids is an important goal in many industries. For example, volatile liquids or mixtures of liquids are often applied in the manufacture of artificial leather, textiles which are coated with rubber or plastic or otherwise impregnated, lacquered or varnished products, light-sensitive copying materials and similar materials. In general, these liquids serve as a solvent, dispersion or emulsion medium. Examples of such liquids are benzene, toluene, alcohols, acetone, methyl acetate, methylene glycol and methylene chloride. Such liquids are generally flammable, poisonous and hazardous to handle as well as expensive.

Many types of apparatus have been proposed for recovering the liquids used to treat or process materials. Preferably, the recovery is carried out in such a manner that the liquids can be used again. Among the more common methods employed, such as absorption, adsorption and condensation, the latter is preferred for a number of reasons. Recovery of a liquid with the aid of condensation can be carried out in a unit separate from the unit used for drying the material, as well as in the same unit in which the drying takes place.

An apparatus of the last-mentioned type is described in U.S. Pat. No. 1,678,886. The apparatus consists of a single unit, essentially closed to the outside atmosphere, and provided with a heating system and a vapor condensing system which is located in the lower part of the unit. The material to be dried is a coated fabric which is guided, in a number of zigzag webs, through the upper part of the unit. The heating system includes numerous heating elements installed between the various material passes in close proximity to or in contact with the uncoated side of the fabric. The condensing system includes numerous condensers located primarily in the lower part of the unit. In addition, a number of condensers are installed on the side-walls of the unit, in the region of the lower zigzag webs of material. This arrangement results in the creation of a gas circulation in the unit by which the vapor mixture resulting from drying is carried to the lowest condensers where they are condensed and removed as liquid in order to be reused. The drying gas from which the vapors have been essentially completely removed circulates back to the higher webs of material and is reused for drying.

A drying apparatus of the prior art type described possesses several disadvantages. Passage of the web through the unit in a plurality of zigzag passes results in mechanical problems since the transport speeds obtainable are limited and difficulties can easily occur in the passage of the web. For example, at the point of the second return for a zigzag pass the coated fabric web must already be guided over a reversing roller contacting its coated surface. Often the web surface will not yet be fully dry so that damage to the web surface, contamination of the first or even following reversing rollers, and obstructions to the smooth passage of the web may occur. In addition, since circulation is based on the differences in specific gravity of the gas containing various levels of vapor, it is rather slow and consequently is difficult to adjust for the proper balances required for a good drying and recovery process. Moreover, the thermal output of the apparatus leaves much to be desired and rather high losses of the treating liquid, as vapor, occur due to escape through the slot-like inlets and outlets of the drying unit through which the web passes.

The difficulty in sealing a drying apparatus through which web-like material is guided for drying, so that vapor mixtures in the apparatus do not come into contact with the external atmosphere, is well known. Consequently, a number of sealing systems for such an apparatus have been proposed, such as, for example, those described in the U.S. Pat. No. 3,403,457 and German patent specification No. 963,662. However, the majority of the known sealing systems for this purpose are of complicated construction.

Accordingly, an object of the present invention is the provision of a drying apparatus and method in which the above-mentioned disadvantages are largely overcome. The drying apparatus according to this invention makes it possible to continuously dry, in an economical way, with a high thermal output, material and to recover almost all evaporated liquid, in such quality as to permit reuse or at least such that loss to the atmosphere is avoided so as to minimize environmental problems.

A further object of this invention is the provision of a web passage sealing system which is of comparatively simple construction while being highly effective, and which is particularly suitable for use with the drying apparatus discussed above.

The drying apparatus according to this invention is advantageously suitable for drying material treated with liquid by heating and circulating a drying gas and for recovering vaporized liquid absorbed by a drying gas. The apparatus comprises at least one chamber unit which is essentially completely closed to the external atmosphere, a heating system in the chamber and a condensing system located in the chamber lower portion, means for guiding the material, in the form of a web, through the chamber through slot-like inlet and outlet openings such that the web is maintained free of contact at its wet surface, and a fan system which causes a forced circulation of the drying gas through the chamber.

The fan system is installed in such a way that it divides or splits the drying gas into a main-stream and a considerably smaller side-stream, and repeatedly transports the mainstream past the web of material and transports the side-stream to and through the condensing system, and from the condensing system back to rejoin the main-stream with the aid of elongated slot-like openings, formed by positioning and dimensioning of the web of material with regard to the side walls and the bottom of the chamber. If required, the heating system, and/or the condensing system and/or separate partitions may be positioned with regard to the chamber walls and bottom, or each other, to provide the circulation openings for stream splitting.

The precise position and exact dimensions of the fan system, the web of material and the other above-mentioned elements of the drying apparatus according to this invention lend themselves to a number of conceivable variations by which the desired split of the drying gas stream into a mainstream and a side-stream and these stream orientations can be obtained as will be apparent from the description below. These variations can be determined by those skilled in the art for the particular material and liquid involved from the teachings herein.

The sealing system according to this invention comprises at least one pair of rotatable rollers, positioned in proximity but not in direct contact to each other, in or at a short distance from the opening made in an outer wall of a drying apparatus chamber, and positioned in such a way with regard to each other and to the web of material to pass through the drying apparatus, that the web runs between the rollers and partially over the circumference of each. Elastic sealing lips contact and press against the surface of the rollers and are directly or indirectly connected to the chamber wall to seal the space between the pair of rollers and the opening in the wall.

The sealing system according to the invention can be installed in an opening made in the outer wall of a drying apparatus chamber in such a way that it forms an integrated part of the drying apparatus and takes the place of the usual slot-like opening for passage of the web. Such a sealing system will find greatest utility when provided as part of a drying apparatus when under construction. However, the sealing system according to the invention can also be used to improve the sealing ability of an already existing drying apparatus. In that case, the rollers and the related sealing lip means can be mounted against the outer wall in the vicinity of the slot-like opening already present in the outer wall of the apparatus chamber.

The drawings illustrate preferred embodiments of the drying apparatus and sealing system according to the invention. Although the embodiments represented are distinguished by simplicity and effectiveness they are not to be considered limiting.

Figure 1:
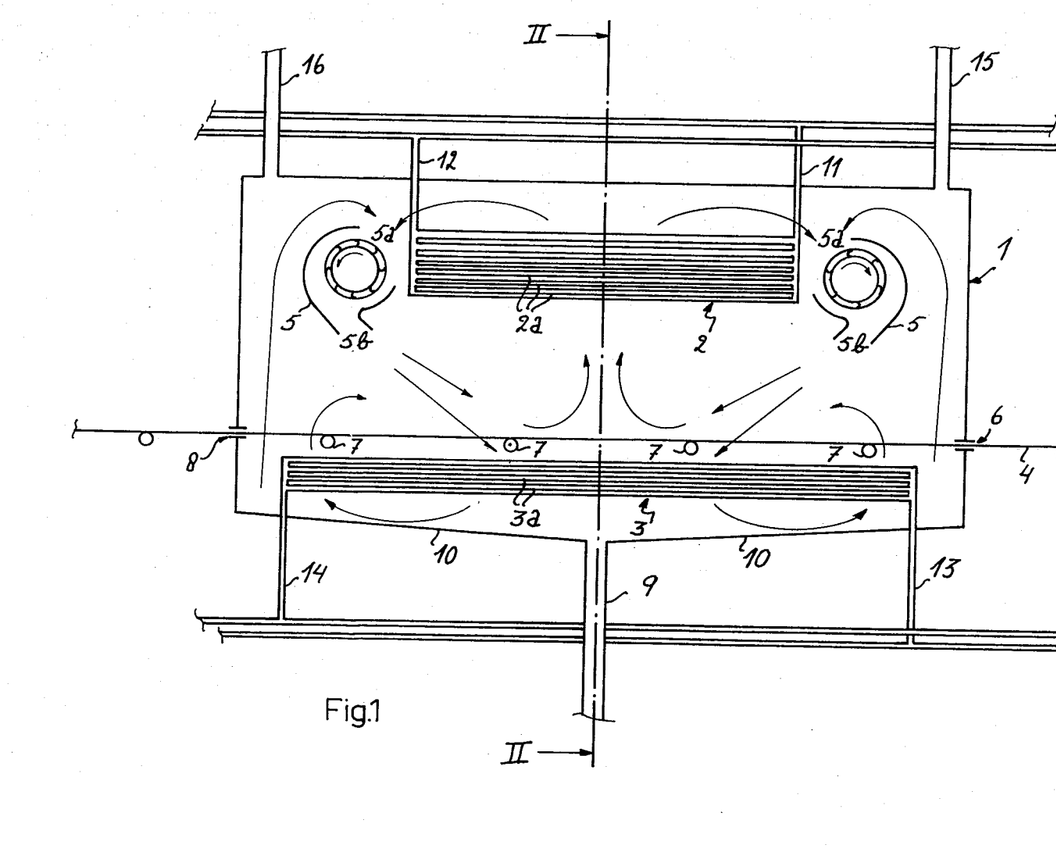
FIG. 1 is a longitudinal section view of an embodiment of a unit of the drying apparatus according to the invention.
Figure 2:
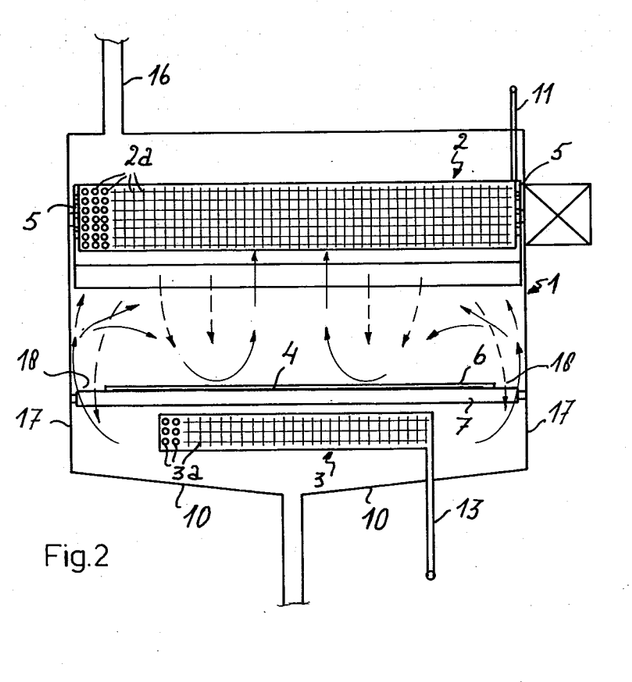
FIG. 2 is a cross section view taken along the line II—II of FIG. 1.

Referring to FIGS. 1 and 2, there is shown a drying apparatus comprising a single chamber unit 1, through which passes a web, 4, of material to be dried. A heating system 2 is installed at a distance above the web while a vapor condensing system 3 is installed at a distance below the web 4. A fan system comprising two cross-flow fans 5, both of which extend a width distance greater than that of the material web 4 (FIG. 2), is installed as closely as possible to the sides of the heating system 2. The inlet section 5a of the cross-flow fans 5 is directed slightly upwards and towards the heating system 2, while the outlet section 5b is slantingly directly towards the surface of the web 4. The condensing system 3 extends a width distance which is less than that of the web 4.

The web 4 enters the chamber through a slot-like entrance or inlet opening 6, passes through the chamber around a number of guide rollers 7 and leaves it through a slot-like exit or outlet opening 8. The material web 4 is narrower than the chamber 1 and passes through the chamber 1 in such a way that an elongated slot-like space 18 is formed between each of its edges and the side walls 17 of the chamber. An opening 9, for the discharge of the liquid to be recovered, is provided for in the center of the chamber bottom 10 which is funnel shaped to lead condensed and recovered liquid to the opening 9.

The heating system 2 is constructed of a number of tubular elements 2a, and is provided with a supply conduit 11 and an exhaust conduit 12 for passage of the heating medium. A supply conduit 15 and an exhaust conduit 16 serve to supply and remove inert drying gas from the chamber in the event that process safety requires the use of inert gas.

The arrows shown in FIGS. 1 and 2 substantially illustrate the manner in which the gas mixture present in the chamber 1 circulates and show the split of the mixture of drying gas and vapor present in the chamber 1 into a main-stream and an essentially smaller side-stream. Also illustrated is the repeated passage of the main-stream past the surface of the web 4 and the passage of the side-stream to the condensing system 3 and from there back to the main-stream. This circulation is achieved by the cross-flow fans 5 drawing the gas mixture, which originates primarily in the uppermost part of the chamber, into the openings 5a. This gas mixture is brought to and kept at the desired temperature by adjustment of the heating system 2. The greater part of this gas mixture is directly blown on to the surface of the web 4.

The cross-flow fans 5, the heating system 2 and the surface of the web 4 cooperate to produce a gas circulation in which the greater part of the gas mixture is blown on to the surface of the web 4, returns to the uppermost part of the chamber 1 and from there is again drawn by the fans 5 to be directed back to the surface of the web 4. The circulation of the gas mixture illustrated in FIG. 1 forms the main-stream.

The side-stream is produced by passing part of the gas mixture coming out of the fan outlet openings 5b through the elongated openings 18 existing between the web 4 and the two side walls 17 of the chamber 1 and directing it towards the condensing system 3 located below the web. The proportion of gas flow between the main-stream and the side-stream is, in this arrangement, mainly determined by the width of the openings 18. In general, it is advantageous to position and control the cross-flow fans 5 and the width of the openings 18 in such a relationship to each other so that the side-stream forms about 2 to 20% of the main-stream.

As a consequence of this division or split into main- and side-stream gas flows, the number of kcal/min to be supplied by the heating system for the drying required and the number of kcal/min to be removed by the condensing system is 50-80% lower than the number of kcal/min required for similar drying and liquid recovery when no split into main-streams and side-streams takes place, such as in the prior art apparatus. Moreover, a much higher passage speed of the web through the unit is possible.

Figure 3:
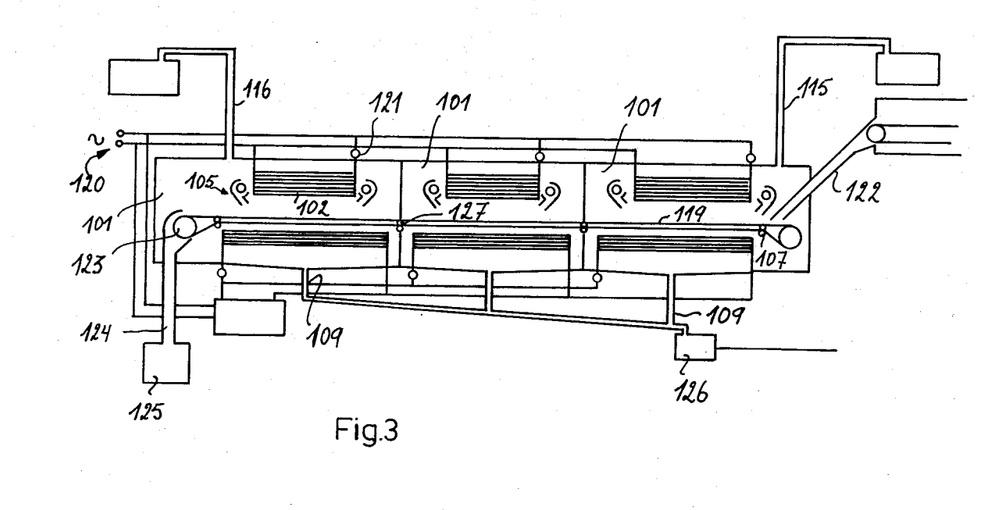
FIG. 3 is a longitudinal section view of an embodiment of a drying apparatus according to the invention, in which three units have been coupled together.

In FIG. 3 is shown a drying apparatus according to an embodiment of the invention comprising three interconnected units 101 of the type shown in FIGS. 1 and 2. By connecting a number of units behind each other, greater control over the drying and recovery process is obtained than is possible with a drying apparatus consisting of only one unit. Such a drying apparatus is especially advantageous when various liquids having different boiling points have been used in the treatment of the material to be dried since these can be recovered more or less individually by separation in a drying apparatus which comprise a number of units in each of which a different liquid may be recovered.

Each of the units 101 illustrated in FIG. 3 are connected with each other through two slot-like passages 127 which are maintained as small as possible. The units correspond essentially with the embodiment illustrated in the FIGS. 1 and 2 with respect to the position and proportional dimensions of the fan system 105 and the material web 119. However, in this embodiment, the heating system 102 comprises a number of electrical elements receiving current through connection 120 from an electrical energy source (not illustrated). The electrical capacity required is regulated by a regulator 121. Also, electrical energy is used for cooling by the condensing system. Moreover, in the embodiment of FIG. 3, web 119 is arranged as an endless belt on which the material to be dried is poured through the supply conduit 122. At the end of the last unit 101, a reversing roller 123 carries the belt 119 back while the material present on the belt is discharged through the pouring funnel 124 to a reservoir 125. The liquid to be recovered, is fed, separated or not, through the opening 109 in each unit 101, to one or more reservoirs 126.

In certain cases it may be desirable to dry the material by blowing the drying gas against its reverse side, that is, the untreated side of the material. In that event, it is possible to successfully utilize a drying apparatus, which comprises at least one unit of the type shown in FIG. 4. In the chamber unit 201 shown in FIG. 4, the fan system comprises a cross-flow fan 205 situated as close as possible to a heating system 202. A condensing system 203 is positioned beneath a partition or covering separation plate 227 installed at some distance below the heating system 202. The partition 227 is of such dimensions that it extends over the condensing system 203 and partitions it from the heating system 202. The condensing system 203 is installed in the lower part 228, a recessed portion of the bottom 210, of the chamber 201, while the heating system 202 is situated at a distance above bottom 210.

Figure 4:
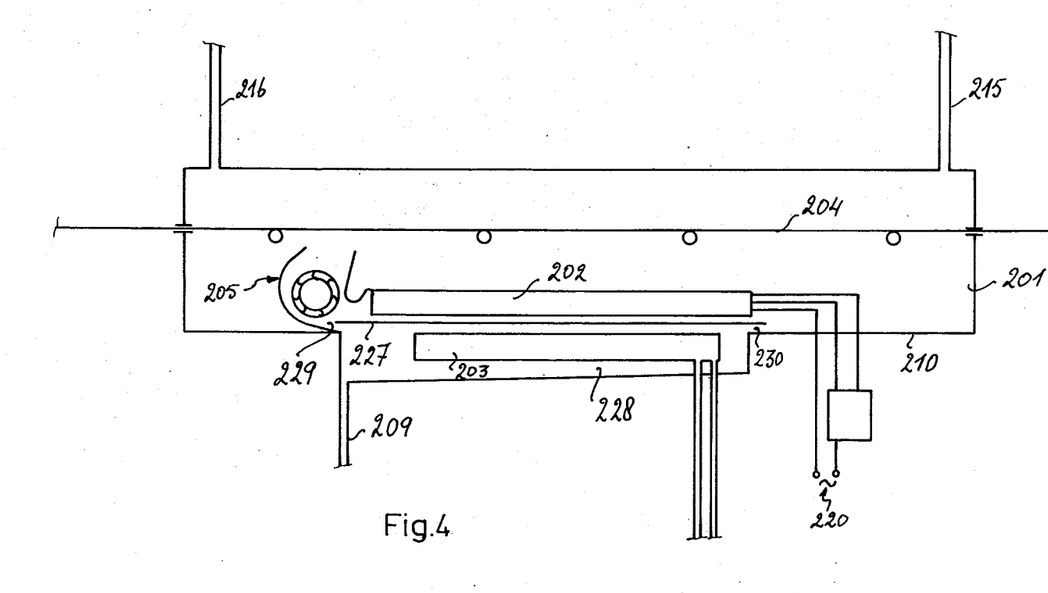
FIG. 4 is a longitudinal section view of a unit of a drying apparatus according to the invention in which the fan system, the condensing and the heating system are located below the web of material.

The covering plate or partition 227 is placed a distance above the bottom 210 and extends over the recess portion 228, somewhat, at its right side. Thus, slot-like channel opening 230 is formed of such dimensions that, in cooperation with the slot-like channel 229, the cross-stream ventilator 205, and the two slots (not illustrated) at each edge of the web 204, produces a desired split of the total gas stream circulating in the unit 201 into a main-stream circulating repeatedly around the material web 204 and an essentially smaller side-stream circulating past the condensing system 203.

Optimum use of the drying apparatus according to this invention is partially achieved by carrying out the drying and recovery process at high dew points. This makes it possible to raise the thermal output of the apparatus even further and to use water as the cooling medium for condensation, which is both cheaper and more attractive from technical and process considerations. In theory the dew point could be raised to slightly below the boiling point of the liquid, or boiling traject of a mixture of liquids, with which the material to be dried has been treated. However, for practical reasons it is recommended that dew points above 80° C. not be chosen because otherwise provisions must be made to prevent condensation at undesired places in the drying apparatus. In general, the required condensation can be obtained with cooling water of 10°-25° C. when utilizing dew points around 60° C. and a main-stream to side-stream proportion of about between 95:5 and 85:15.

In order to obtain the widest freedom in the choice of the optimum dew point, it will generally be necessary to maintain the oxygen concentration in the drying apparatus outside of the explosive range with the aid of an inert gas, such as, for example, nitrogen or carbon dioxide. This range depends primarily on the liquid used during the treatment of the material to be dried.

When operating the drying apparatus at high dew points, it is preferable to provide it with one or more oxygen and temperature measuring devices or meters, as well as means for supplying inert gas and for degassing. Also, the use of one or more explosion suppressors is recommended in such instances. In order to increase the operational safety of the drying apparatus even further, the aforementioned measuring equipment is preferably installed in such a way that a large quantity of inert gas is quickly supplied to the apparatus when the chosen limits are surpassed, so that the mixture present in the device is instantly brought out of the explosive range.

The percentage of the liquid recovered can be increased even further if the drying apparatus is hermetically connected with the apparatus in which the material to be dried is subjected to the liquid treatment and which is also essentially closed to the external atmosphere. In this way, the material treated can be transported to the drying apparatus without having been in contact with the external atmosphere and the chances of environmental pollution are further decreased. This can be especially important when the material is dried at low web speeds and has been treated with liquids boiling at low temperatures and/or which are noxious, and/or very high demands are made for the protection of the environment. Furthermore, the risk of damage to the material, which at that moment is wet and vulnerable, is also reduced.

Figure 9:
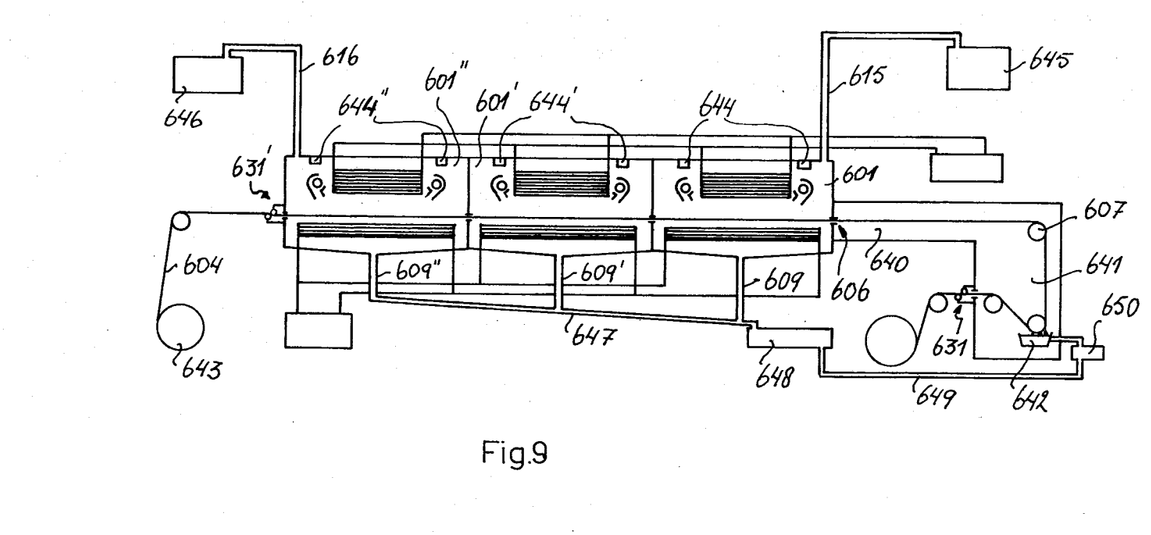
FIG. 9 is a longitudinal section view of another embodiment of a drying apparatus according to the invention.

A drying apparatus hermetically connected with the apparatus in which the material to be dried is subjected to the desired liquid treatment, and which is also closed to the external atmosphere, is illustrated in FIG. 9. The drying apparatus shown in FIG. 9 comprises three units 601, 601' and 601", each of the type shown in FIG. 1, which are hermetically connected with each other. The unit 601 is hermetically connected through a slot-like opening 606 and a channel 640 with a coating apparatus 641, which is also closed to the external atmosphere to the extent possible.

A web, 604, of material enters the coating apparatus 641 through the special sealing system 631 as described in more detail hereinbefore. After the web 604 has been treated in a coating system 642, of a known type, it is conveyed over a number of guide rollers 607 through the slot-like opening 606 into the unit 601 of the drying apparatus. It leaves the apparatus, after passing through the three units 601, 601' and 601", through a special sealing system 631', which is substantially of the same type as the sealing system 631. The material web 604, which is now fully dry, is wound on the storage roll 643. The recovered liquid, discharged through the channels 609, 609' and 609" into a collecting channel 647, is collected in a reservoir 648. From the reservoir 648, the liquid is conveyed through a conduit 649 to a mixing device 650 for reuse. For example, a light-sensitive composition may be prepared in device 650 which is then applied in the coating apparatus 641 on to the material web 604, which may be a paper support.

The drying apparatus shown in FIG. 9 is provided with explosion suppressors 644, 644' and 644" and with oxygen and temperature measuring meters (not shown) of known types which are commercially available. Inert gas can be supplied from a storage tank 645 through a conduit 615 into the unit 601, from whence it dissipates over the two other units. In the case of an emergency, or even under normal circumstances, such as for repairs or modifications, the gas mixture present in the units can be quickly exhausted through a conduit 616 to a storage tank 646. The above-mentioned provisions make it possible to operate the drying apparatus at high dew points without significant risk of explosion. If desired, the coating device 641 may also be provided with inert gas.

Figure 5:
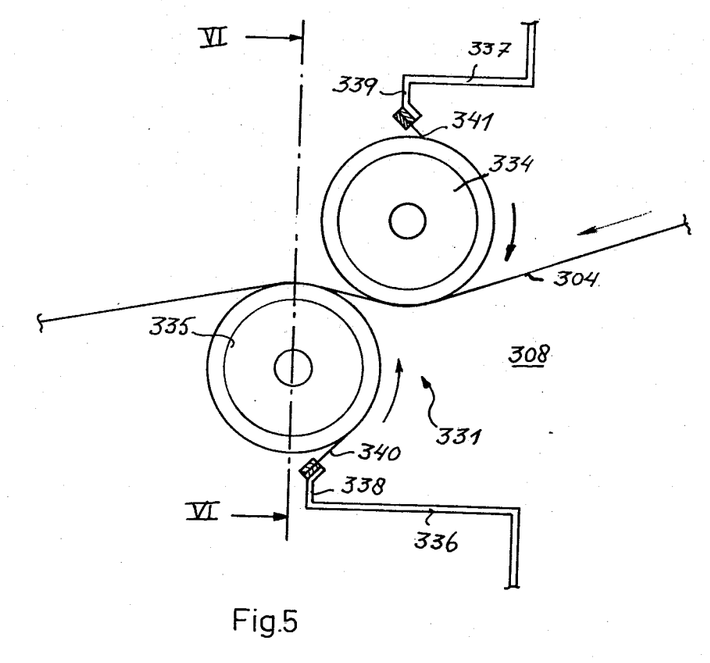
FIG. 5 is a longitudinal section view of an embodiment of a sealing system of a drying apparatus according to the invention.
Figure 6:
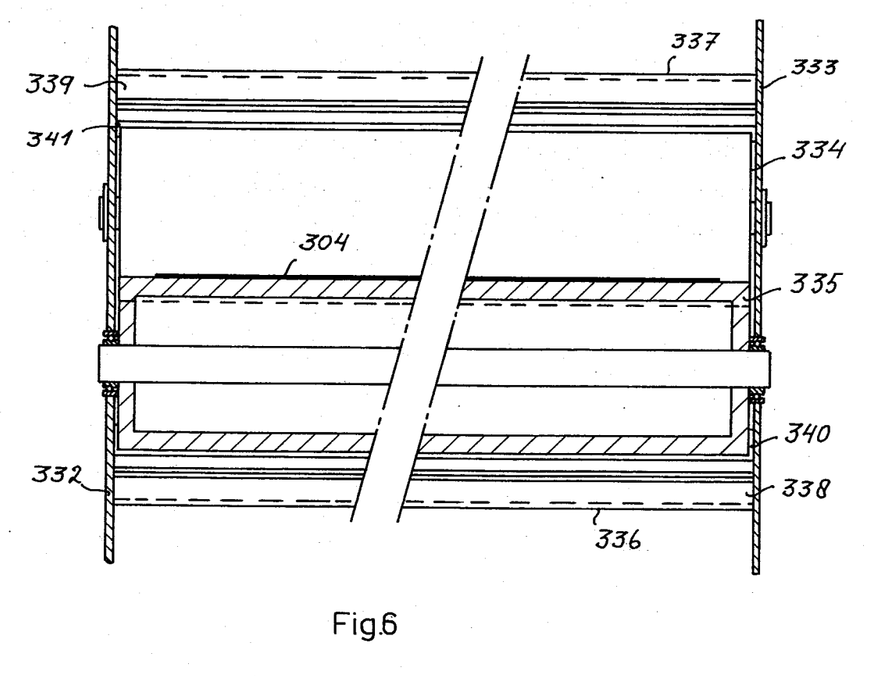
FIG. 6 is a cross section view taken along the line VI—IV in FIG. 5.

Referring to FIGS. 5 and 6, there is shown an outlet opening 308 in the last unit of a drying and recovering apparatus (not shown) through which a material web 304 leaves the apparatus. A sealing system 331 comprises two rollers 334 and 335 which are rotatably supported in bearings in the two side-walls 332 and 333 of the sealing system. The rollers are positioned in such a way with respect to each other and to the web 304, that the web partially covers the circumference of each roller. The space between the two rollers 334 and 335 at the one side and the opening 309 at the other is sealed to the external atmosphere by two horizontal walls, 336 and 337, two vertical side-walls, 332 and 333, and two bent edges, 338 and 339, at the end of which are located two elastic sealing lips 340 and 341. Sealing lip 340 presses firmly against the surface of roller 335 and sealing lip 341 against the surface of roller 334.

Figures 7, 8:
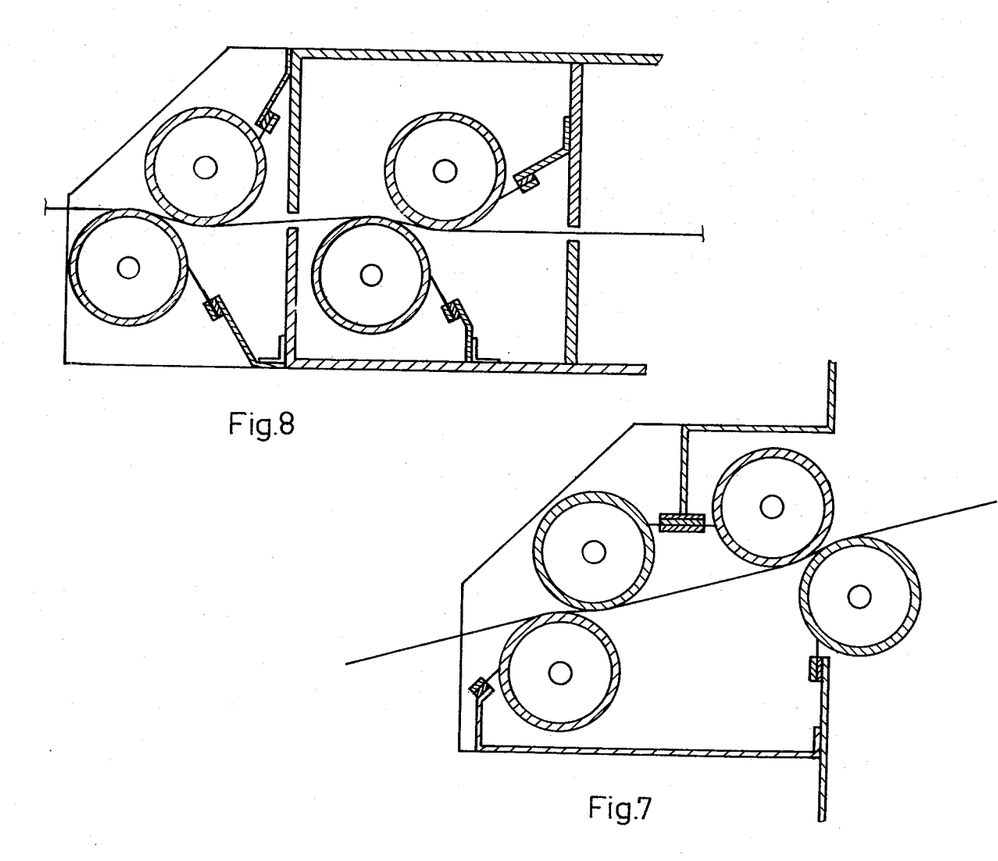
FIG. 7 is a longitudinal section view of another embodiment a sealing system of a drying apparatus according to the invention.
FIG. 8 is a longitudinal section view of another embodiment of a sealing system of a drying apparatus according to the invention.

FIGS. 7 and 8 illustrate two variations of the sealing system according to the invention. As shown, two pairs of rollers are used successively, instead of one, by which the operation of the sealing system according to the invention is even further improved. This may be especially advantageous when the liquids used in the treatment of the material are highly volatile and noxious or detrimental to the environment. For further protection, the space between the two pairs of rollers can be filled with inert gas.

The sealing system shown is not recommended for sealing the inlet opening of a drying apparatus through which the material to be dried enters, because at that point the material must be kept free of contact at its surface. However, with the preferred embodiment of a drying apparatus discussed above, in which the drying apparatus is connected hermetically with the sealed coating apparatus, the sealing system can be utilized for introducing the web into the coating apparatus which then is also essentially closed to the external atmosphere. In this way, the total system, consisting of drying apparatus and coating apparatus, can be sealed in such a way that the risk of vapor mixtures present in the total system being exposed to the external atmosphere is minimized. Also, in this manner, it becomes easy to keep the oxygen concentration in the system below the level at which an explosion might occur, and to eliminate unwanted discharge to the environment almost completely.

I claim:

1. In an apparatus for drying material which has been treated with a liquid and for recovering the liquid released from the material as vapor into a drying gas stream, including at least one chamber essentially closed to the external atmosphere, a heating system and a vapor condensing system contained within the chamber with the condensing system being located in the lowest part of the chamber, the improvement comprising guide means located in the chamber for guiding the material through slot-like openings in the chamber and through the chamber as a web the wet surface of which is maintained free from contact, the condensing system being located beneath the material web, a fan system means for causing forced circulation of the drying gas in the chamber, the guide means being located so that the material web is guided with the edges of the material web being spaced from inner side walls of the chamber so as to form elongated openings therebetween, the drying gas circulation means being positioned in the chamber with respect to the material web as to cause the system of drying gas and vapor contained therein to be divided into two streams one of which repeatedly circulates past the wet surface of the web as a mainstream and the other of which circulates as a sidestream through the elongated openings at the web edges to the condensing system located beneath the web for condensation of the vapor and from there to rejoin the main stream as drying gas.

2. The improvement as claimed in claim 1 wherein the fan system means has a drying gas circulation outlet portion which extends for a width distance as measured between the chamber inner side walls which is greater than the material web width dimension also as measured between the chamber inner side walls.

3. The improvement as claimed in claim 1 wherein the fan system means comprises at least one cross-flow fan.

4. The improvement as claimed in claim 3 wherein the cross-flow fan(s) (are) provided with downwardly directed gas circulating outlet openings, the heating system and the cross-flow fan(s) are located proximate each other above the material web and the condensing system is so positioned and dimensioned with respect to the material web that it does not extend beyond the edges of the web.

5. The improvement as claimed in claim 1 wherein the fan system and the heating system are located proximate each other below the material web, the chamber bottom is provided with a recessed portion, a covering plate extends over the bottom recessed portion and separates the recessed portion from the fan system and heating system, the condensing system is located in the bottom recessed portion, and at least either the edge of the heating system furthermost removed from the fan system or the covering plate edge adjacent thereto extends over the edge of the recessed bottom and is spaced from the bottom to form, with the chamber bottom, an opening permitting gas to circulate past the condensing system.

6. The improvement as claimed in claim 1 further comprising means for supplying inert gas to the chamber, means for suppressing explosions and means for measuring the temperature and means for measuring the oxygen content of the chamber.

7. The improvement as claimed in claim 1 further comprising means hermetically connecting the chamber with an apparatus in which the material web is treated with the liquid and which is essentially closed to the external atmosphere.

8. The improvement as claimed in claim 1 further comprising a sealing apparatus located at the opening in the chamber through which the material web leaves the chamber for guiding the web of material through the opening while maintaining the chamber essentially closed to the external atmosphere, the sealing apparatus comprising at least one pair of rollers in proximity to one another and located in proximity to the chamber opening, the rollers being positioned in relation to one another in such a manner that they are not in direct contact with each other and that the web of material passes between them and partially covers the circumferential surface of each roller as it passes over it, elastic sealing lips contacting the roller circumferential surfaces and connected to a portion of the chamber wall defining the opening therein to seal the space between the rollers and the opening.

9. The improvement as claimed in claim 8 further comprising means for hermetically connecting the chamber with an apparatus in which the material web is treated with the liquid and which is essentially closed to the external atmosphere, the material web liquid treating apparatus having an opening through which the material web is introduced for treatment, and a sealing apparatus, identical to the sealing apparatus located at the chamber opening through which the web of material leaves the chamber, being located at the opening through which the web of material enters the treating apparatus.

10. The improvement as claimed in claim 1 wherein the apparatus further comprises a plurality of chambers each of which contains a heating system, vapor condensing system and drying gas circulation means as claimed in claim 1, the chambers being interconnected one behind the other through slot-like passages through which the material web passes.

11. In a method for drying material which has been treated with a liquid and for recovery of the liquid released from the material as vapor into a drying gas stream comprising guiding a web of the material through a chamber essentially closed to the external atmosphere, the chamber comprising a heating system and a vapor condensing system within the chamber, with the condensing system being located in the bottom of the chamber, the improvement therein comprising guiding the material through slot-like openings in the chamber and through the chamber above the condensing system as a web the wet surface of which is maintained free from contact, circulating drying gas in the chamber by means of a fan system, maintaining the edges of the material web spaced from inner side walls of the chamber so as to form elongated openings therebetween, dividing the drying gas into two streams, a main stream and a side stream, repeatedly circulating the drying gas and vapor contained therein past the wet surface of the web as the main-stream and through the elongated openings at the web edges, as the side-stream, to the condensing system located beneath the web, condensing the vapor and circulating the side-stream back to the main-stream as drying gas, supplying inert gas to the chamber to reduce the oxygen concentration therein and maintaining the dew point in the chamber at a high level.

12. A method as claimed in claim 11 wherein the main-stream to side-stream ratio is maintained at between 98:2 and 80:20.

13. The improvement as claimed in claim 11 further comprising guiding the material web through a plurality of chambers and controlling the heating and vapor condensing individually in each of the chambers so as to enable individual recovery of treating liquids having different boiling points by separation in the individual chambers.

* * * * *